PRINTING PLATES

Filed April 8, 1957

2 Sheets-Sheet 1

TYPE FORM

MOLD FORMATION

ELECTROPLATING

LEAD BACKED ELECTROPLATE

PLASTIC BACKED ELECTROPLATE

PLASTIC PLATE

PLASTIC PLATE FOUNDATION

INVENTORS
Stephen W. Johnson, Jr.
Charles G. Harford
Gordon W. Allan
BY
Winston E. Miller
ATTORNEY

PRINTING PLATES

Filed April 8, 1957

INVENTORS
Stephen W. Johnson, Jr.
Charles G. Harford
Gordon W. Allen
BY
Winston E. Miller
ATTORNEY United States Patent Office 3,145,654

Patented Aug. 25, 1964

3,145,654

PRINTING PLATES

Stephen W. Johnson, Jr., Lafayette, Charles G. Harford, San Mateo, and Gordon W. Allen, San Francisco, Calif., assignors to Printing Plates Research, Inc., Columbus, Ohio, a corporation of Ohio Filed Apr. 8, 1957, Ser. No. 651,190
3 Claims. (Cl. 101—401.1)

This invention relates to plastic printing plates.

More particularly, the invention relates to plastic printing plates in which an electrotype copper shell is backed up and reinforced by plastic, and also to printing plates in which the plastic forms the printing surface as well as the body of the plate.

It is common practice today to produce electrotype plates in the following manner: Type forms or original plates are locked in a chase and are surrounded by a dam or retaining wall. The surface of the type form or original plate is coated with a release agent such as graphite. A sheet of suitable thermoplastic material, such as wax or vinyl resin, is then applied to the type form or plate and heat and pressure are employed to form an impression of the type form or plate on the plastic sheet.

A plastic mold is thus produced which is stripped from the type form or original plate. It is shaved, built up as required, and treated by a silver spray or other suitable material to render it a conductor of electricity. It is then placed in a tank containing an acid solution of a copper salt. A copper shell is deposited on the mold electrolytically. The resulting thin copper shell is stripped from the plastic mold and is backed with lead.

The resulting lead backed copper plate must then be subjected to a laborious, time-consuming and expensive finishing operation in which it is hammered on the back on a flat surface, called a finishing slab. Carbon from a flame is applied to the printing surface and then rubbed off to reveal low spots. The hammering and smoking operation are repeated until a satisfactory printing surface is produced.

Such tedious finishing operation is required, even though the copper shell may have been a perfect reproduction of the type form or plate, because the heat of the molten lead and differential shrinkage of the lead and copper cause warping and buckling and produce imperfections. These imperfections must be removed in the manner indicated. The finishing operation requires highly skilled and very expensive labor; it is time-consuming; and it requires considerable space in an electroplate shop. Moreover, the plate must also be shaped or planed on its reverse side to remove irregularities resulting from the finishing operation. Another disadvantage of such plates is their great weight.

Heretofore, plastic plates have been produced for printing operations which have certain advantages over electrotype plates. These plates have been of two kinds; either made from a thermoplastic material such as Vinylite, or made from a thermosetting resin such as a phenolformaldehyde resin. Plates of a thermosetting resin are usually made by molding under pressure at a high temperature. The requirement of heat and pressure necessitates expensive equipment. Thermoplastic resins as a general rule are unsatisfactory because of their relative softness and because they are subject to attack by solvents commonly used.

It is an object of the present invention to provide improved printing plates and improved methods of producing the same.

It is another object of the invention to provide plastic printing plates which have or which closely approximate the quality and durability of properly finished electrotype plates, yet are considerably cheaper to produce.

Yet another object of the invention is to provide printing plates and a technique for producing the same which avoids the necessity of complex finishing operations or reduces the extent of the same.

Another object is to provide plastic printing plates which possess most or all of the good qualities and lack certain of the disadvantages of electrotype plates, which do not require heat and pressure in their production, which are relatively free from warping and shrinkage, and which have good wearing qualities.

These and other objects of the invention will be apparent from the ensuing description and the appended claims.

Certain forms of the invention are illustrated by way of example in the accompanying drawings and are contrasted with prior practice.

In the drawings, FIGURES 1A, 1B, 1C and 1D illustrate successive stages in the production of electrotype plates in accordance with conventional technique.

Figure 1A:
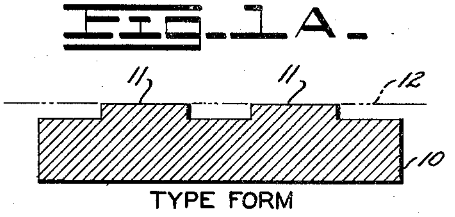

Referring to the drawings and more particularly to FIGURES 1A, 1B, 1C and 1D, in FIGURE 1A there is shown a type form which is generally designated by the reference numeral 10. The type form 10 is made up in conventional manner from letter press characters, together with a cut or cuts if required. Two high points 11 are shown which, if the type form itself were employed in a press, would be inked and would leave an impression upon the paper printed. The horizontal dotted line indicated by the reference numeral 12 is the printing surface or printing plane.

In accordance with present day, conventional electrotype technique, a mold is prepared which reproduces the type form or original plate in reverse. This is done by building a suitable retaining dam or wall about the type form to produce an original mold, then pressing a sheet of suitable plastic material such as wax or a vinyl resin onto the type form to cause it to assume the shape of the type form. A plastic mold is produced which is shown at 13 in FIGURE 1B. The plastic mold 13 reproduces the type form in reverse. Representative materials for preparation of a mold are wax (ozokerite or wax from petroleum), and vinyl acetate-vinyl chloride copolymers, e.g., "Vinylite" plastics of Bakelite Co., a division of Union Carbide and Carbon Corporation, New York, N.Y.

Next, the plastic mold 13 is stripped from the type form. Stripping is facilitated by reason of the fact that the type form has been previously treated with a suitable release agent, e.g., a silicone, paraffin wax or graphite. The stripped mold 13 is coated with a conductor such as graphite and is suspended in an electroplating bath. As illustrated in FIGURE 1C, a metal shell, usually a copper shell, is deposited on the surface of the mold by electrolytic means. The copper shell is shown at 14, and it will be apparent that it reproduces the mold 13. Since it reproduces the mold 13 in reverse, the copper shell 14 has the same configuration as the original type form 10 shown in FIGURE 1A.

Next, the copper shell 14 is stripped from the mold 13. Then a retaining dam is built around the copper shell and molten lead is poured into the space enclosed by the dam to form a lead backing 15. A lead backed copper shell is produced which constitutes what is known in the art as an electrotype plate. As will be seen, raised portions 11*a* are provided which are the same as the raised portions 11 of the original type form 10, and the printing surface is shown at 12*a* corresponding to the printing surface 12 of the original type form. That is, if the original plate 10 is regarded as a positive, then the electrotype plate 16 is also a positive.

However, as explained hereinabove an electrotype plate produced in this manner has many flaws and imperfections which result largely from cooling of the hot lead and the copper shell. A tedious and very expensive finishing operation is required which requires a great amount of time and skill. Provided all of the steps described, including the finishing operations, have been carried out properly, a printing plate is provided in which the printing surface 12*a* is uniform and is a faithful reproduction of the original plate or type form. However, still other operations are required, such as shaving the back surface of the electrotype plate to remove dents and irregularities resulting from the finishing operation.

Figure 1B:
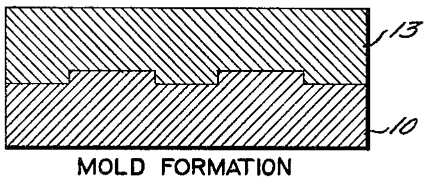
Figure 1C:
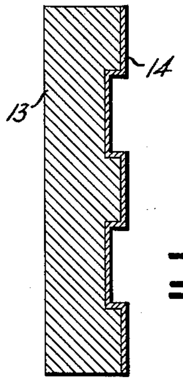
Figure 2B:
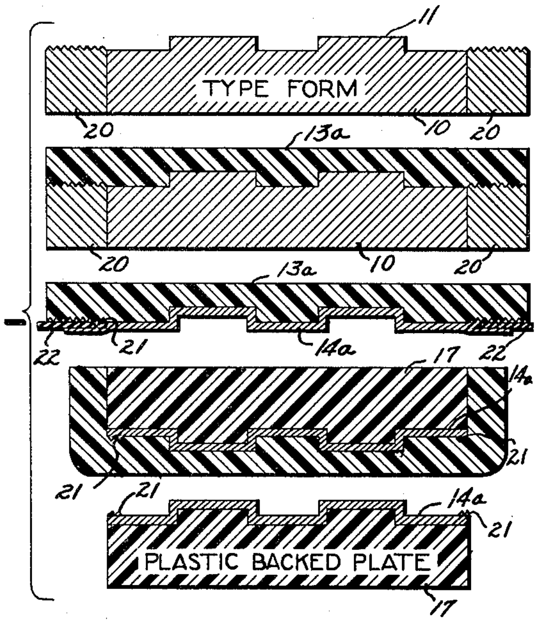
FIGURE 2B shows the sequential forming of the plastic backed metal electroplate as shown in FIGURE 2A.
Figure 2A:
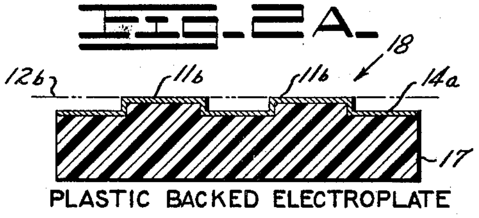
FIGURE 2A illustrates one form of the invention, in which a conventional copper or other metal electroplate is backed with a plastic in accordance with the present invention.
Figure 3B:
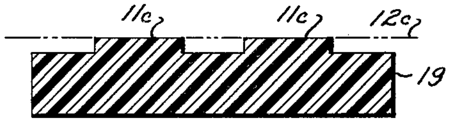
FIGURE 3B shows the finished plastic plate as formed in FIGURE 3A.
Figure 3A:
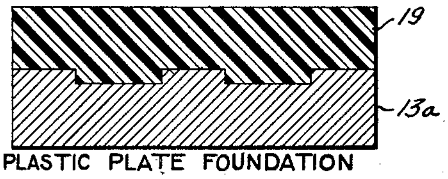
FIGURE 3A shows a schematic method for directly forming a plastic plate from a plastic mold (no metal shell).

In accordance with the present invention and as illustrated in FIGURES 2A, 3A and 3B, a certain form of plastic material is employed which has the property of cold setting and which is capable of reproducing faithfully a type form or original plate. It may be applied to the reverse (i.e., negative) side of a copper shell, such as that shown at 14 in FIGURE 1C to replace the lead backing 15. Alternatively, the plastic may be applied to a mold, such as that shown at 13 in FIGURE 1B, then stripped to produce a plastic printing plate.

Figure 1D:
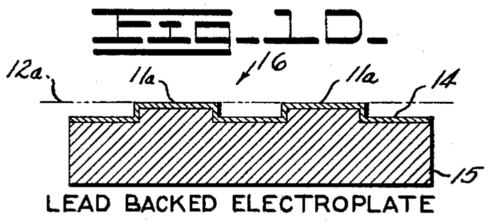

Referring now to FIGURE 2A a copper shell, electrotype plate is shown at 14*a* which is identical with that shown at 14 in FIGURE 1C and 1D, such plate having raised portions 11*b* and a printing surface 12*b*. Rather than applying lead to the reverse side of such copper shell, a plastic material of a type described hereinafter is applied to the reverse side of the copper shell by a procedure similar to that employed in applying a lead backing, preferably modified as described in Example 2 hereinafter. However, as explained hereinafter, no heat (likewise no pressure) is necessary for this purpose. A plastic backing 17 is produced, thus providing a plastic backed electroplate which is generally designated by the reference numeral 18.

As explained in detail hereinafter the resulting plastic-backed, metal printing plate 18 is a product having the same high quality as a properly prepared lead-backed electrotype plate such as shown at 16 in FIGURE 1D. Moreover, the plastic-backed plate 18 is advantageous for several reasons including the following: It is much lighter in weight and it does not require the expensive finishing operations required for lead-backed plates.

Referring now to FIGURES 3A and 3B, in FIGURE 3A a plastic mold is shown at 13*a* which is formed in the same manner as the mold 13 in FIGURE 1B; i.e., by pressing a plastic sheet, e.g., a sheet of vinyl resin, against an original plate or type form such as shown at 10 in FIGURES 1A and 1B. The mold is then treated with a suitable release agent; a retaining wall or dam is built around the mold; and a plastic material of the nature described hereinafter is applied to produce a plastic plate 19 which is stripped from the mold. In FIGURE 3B the plastic printing plate 19 is shown as having raised printing portions 11*c* lying in the printing plane 12*c*.

It will be seen that, by the procedure described above with reference to FIGURES 2A, 3A and 3B, the need for a lead backing such as shown at 15 in FIGURE 1D is eliminated. A plastic-backed electrotype plate is provided such as shown in FIGURE 2A, or a plastic printing plate is provided such as shown in FIGURE 3B. As mentioned above, plastic printing plates are not new. Most such plates are prepared from phenolic resins and vinyl resins. These prior plastic plates have advantages over lead-backed electrotype plates. Notwithstanding these advantages, and notwithstanding the fact that plastic printing plates have been available for 30 to 40 years, their usage today is very small compared to electrotype plates. Disadvantages that have militated against the use of plastic plates include the high cost of equipment required, warpage, wear, low resistance to attack by solvents and shrinkage. Phenolic plastics enjoy certain relative advantages and vinyl plastics enjoy others, but neither class of plastics has been really satisfactory.

In accordance with the present invention, certain particular types of resin are employed to produce plates such as shown at 18 in FIGURE 2A or at 19 in FIGURE 3B. These resins provide a much less expensive product than conventional electroytpe plates; they do not require heat and pressure; they are resistant to solvents commonly employed in connection with a printing press, such as gasoline, kerosene, carbon tetrachloride, benzene, and alcohol and ketones such as acetone, they do not warp; and their shrinkage is low.

In accordance with the present invention, a cold setting resin having adequate solvent resistance, toughness and hardness and low shinkage is employed. The preferred resins are epoxy resins but others of similar characteristics may be employed as described hereinafter.

As is well known, epoxy resins are copolymers of an epoxide such as epichlorohydrin and polyphenol such as bisphenol-A. The following structure is generally accepted for an epichlorhydrin-bisphenol-A copolymer:

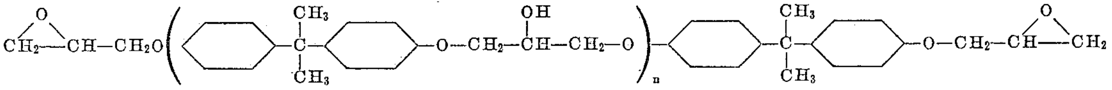

It will be apparent that other epoxide units may be employed instead of epichlorhydrin, and that other polyhydric or other polyfunctional compounds capable of condensation with epoxides may be employed instead of bisphenol-A. Other types of resin may be employed, such as polyesters (e.g., glycerolphthalic acid polyesters). Examples of suitable polyesters are given in Payne, "Organic Coating Technology," vol. I, published by John Wiley and Sons in 1954, pages 302–304. Examples of suitable commercial polyesters are Astrolite R–280 of Industrial Plastics Co. of Oakland, California; Paraplex P–43 of Rohm and Haas and "Laminac" of American Cyanamid Co. The preferred resins are, however, the epoxy resins.

The following specific examples will serve further to illustrate the invention.

*Example 1.*—Epon 828 was employed as the principal reactive ingredient together with Epon 562 to reduce viscosity. These epoxy resins were employed in the proportions of 65 and 28 parts by weight, respectively.

"Epon" is a trademark of Shell Chemical Corporation, New York, N.Y., employed for the epoxy resins of that company. "Epon 828" is described in detail in a publication of Shell Chemical Corporation entitled "Polymer Progress," No. 1, dated March 1955. As there described it is essentially the diglycidyl ester of bisphenol-A containing a small amount of higher homologues; it is a viscous liquid, has a color (Gardner) of 12 maximum, a viscosity of 5000–15,000 cps. and an epoxide equivalent of 175–210.

"Epon 562" is described (also Epon 828) in Technical Bulletin SC:54–71 dated December 1954 published by the Shell Chemical Corporation. Epon 562 is there described as a liquid of viscosity C–F at 25° C., having a color (Gardner) of 5 maximum and an epoxide equivalent of 140–165. Like Epon 828 it is an epoxy resin but it is more reactive than Epon 828 and does not by itself yield as good a product as Epon 828 for purposes of the present invention. It is employed as a reactive diluent to reduce viscosity of Epon 828.

To the above mixture of Epon 828 and Epon 562 was added 7 parts by weight of diethylene triamine as a curing agent.

*Example 2.*—Copper electrotype shells were prepared by conventional technique and were left attached to their plastic molds. A suitable dam was constructed about each shell with the plastic mold beneath and the copper shell exposed. Then the mixture of Example 1 (65 percent Epon 828, 28 percent Epon 562 and 7 percent diethylene triamine) was poured onto the copper shell and allowed to set and cure overnight. Then the plastic mold was stripped from each copper shell. By this means, sturdy, high quality printing plates were produced without heat or pressure. These plates require no finishing.

*Example 3.*—Plastic molds were prepared by conventional technique, i.e., by pressing vinyl sheets or wax against type forms which had been treated with a suitable release agent. The plastic molds were stripped from the type forms and a dam or retaining wall was built around each mold. The intaglio surface of each mold was treated with a release agent. The resin mixture was poured onto the molds and allowed to cure. The cured resin was then stripped from the molds to produce high quality, tough plastic printing plates.

The plates produced as in Examples 2 and 3 may, after trimming and sizing, be used as flat plates or may be bent to serve as curved plates, and they may be mounted on wood or metal blocks.

*Example 4.*—A polyester resin was employed in this case instead of an epoxy resin. The polyester resin was a commercially available material known as "Astrolite R 280," the trademark of a product of Industrial Plastics Co. of Oakland, California. To ¼ gallon of the resin was added ½ ounce of a cold setting compound (a 60 percent solution of a peroxide such as methyl ethyl ketone peroxide) which was blended with the resin. Then ½ ounce of a 6 percent solution of cobalt naphthenate was added as a hardener and blended in. It is important that the setting compound and hardener not be premixed, because of explosion hazard. The mixture should be used within ¾ hour, and is used in the same manner as the epoxy resins of Examples 2 and 3, to yield plastic backed copper electroplates (Example 2), or plastic plates (Example 3). The resin cures somewhat more rapidly than the epoxy resins, and it has the disadvantage compared to the latter that a shrinkage results, e.g., an 8 percent shrinkage. This can be compensated for in part by incorporating a filler.

Other curing agents may be used, e.g., diethyleneamine, triethylene tetramine, etc. Also fillers may be added to the resin preferably not exceeding about 30 percent of the weight of resin. Suitable fillers are aluminum powder, other metal powders, diatomaceous earth, and calcium carbonate. Such fillers increase hardness and decrease cost.

Preferably, the resin or resin mixture employed, besides being a cold setting resin, has a viscosity not above about 2000 centipoises at 25° C.

As noted above, the epoxy resins are preferred. These resins are highly stable dimensionally and shrink very little. Low shrinkage is of great importance in producing printing plates. The polyesters above-mentioned are less stable dimensionally, therefore are not preferred. However, the shrinkage of polyesters can be compensated by the addition of fillers.

In handling cold setting resins of the type described herein, several other factors deserve special comment. Pot life may be very short, e.g., only 15 minutes. Therefore, the catalyst should be added only shortly before pouring the resin into the prepared mold or molds. Once poured, a resin such as the mixture of Example 1 will generally set to a gel in about one hour; it will set and cure overnight sufficiently to permit handling, and final cure may require about one week. However, plates so prepared may be used after an overnight set.

The reaction is exothermic up to the gelling point. Curing can be accelerated thereafter by heating in an oven to, say, 50° C. Higher temperatures may injure the original mold.

It will, therefore, be apparent that plastic printing plates have been provided which are of high quality, which are economical to produce and which wear well, have a high resistance to solvents and do not warp.

In the development of the plastic backed printing plates, e.g. electrotypes, and of the all plastic printing plates, it has been necessary to alter the basic characteristics of the conventional casting and potting resins previously found useful in the forming of resin duplications of wood, metal and other objects in tooling applications. This problem has been accentuated by the wide use of resinous, flexible materials, usually thermoplastic resins, which are employed in the making of a resinous impression mold of the original type form or plate, which procedure is discussed in column 1: Waxes, latices, natural gums and resins, such as paracumarone, vinyl acetate-vinyl chloride copolymers and modified alkyd resins in either sheet form or as laminates supported by soft metal cores are used. U.S. Patent 2,400,518 sets forth a preferred vinyl resin sheet (referred to as "Vinylite (T.M.)) and U.S. Patents 2,172,563 and 2,632,722 disclose resin-gum-wax admixtures in molded tablet or sheet form, both of which sheets are widely used in conventional electrotype practice. However, the resulting impression mold, while defining accurately and precisely the character of the type form or plate, usually exhibits a relatively low softening and/or melting point. Consequently, the reaction conditions under which casting resins can be poured or cast in such impression mold must be controlled within the limitations imposed by the character of the impression molds. As such, fast acting exothermally reacting resin systems should be employed and controlled at low temperature in order not to damage or otherwise warp the impression mold.

In addition, the finished plastic backed printing plate, e.g. electrotype should not only be hard and tough enough to withstand the continual battering in the printing press but at the same time should possess a substantial amount of resiliency and dimensional stability so that the roughly cast plastic backed or all plastic plate can be machined, leveled and planed with conventional metal working equipment available in production electrotype plants, as generally referred to in columns 1 and 2.

Further, the production schedule in electrotype plants, for example, is set up so that the roughly cast, plastic backed electrotype should be ready for machining in three or less hours. Extensive curing operations would normally be uneconomical.

Accordingly, fast acting resin systems have been developed that cure rapidly at low temperature and yield tough, impact and abrasion resistant backings having substantial resiliency. Thus, the present invention includes the provision of these novel, formulated resin systems.

At the same time, numerous process innovations have been developed in order to successfully cast resin backed and all resin plates within the confines imposed by the limitations in both the properties of the impression molds and in the performance demands of the finished backings. Several of these innovations result in the elimination of certain steps employed in conventional electrotype practice and in the altering of others. The present invention further contemplates several new process steps, each of which have resulted from the solving of problems newly created by the attempted utilization of certain resins.

The creation of novel resin formulations and the development of these process innovations has further led to the prepartion of successful plastic backed printing plates and all plastic plates that in themselves display unusual properties, such as durability, resiliency, resistance to solvents, impact resistance, abrasion resistance, dimensional stability, machinability and the like. The present invention further provides such novel printing plates, e.g. plastic backed electrotypes, and all plastic printing plates, both as substantially flat and as curved plates.

The following general description of the improved process is made with specific reference to electrotypes, as shown in FIGURE 2B which may utilize straight type forms, type forms with combination type and engravings, and mounted and unmounted engravings, but the process has been applied to other conventional forms of printing plates with satisfactory results.

*General Description of Process*

The original type form is made ready, bringing up low cuts and lines of type in order to provide as even a printing surface as possible. Noticeable defects in height must be corrected so that a true, finished plate (plastic backed) will be produced. The Vinylite (T.M.) sheet (U.S. Patent 2,400,518) or resin-gum wax tablet (U.S. Patent 2,632,722) of approximately 0.030 to 0.040 inch thickness is applied to the type form under heat and pressure, an accurate impression of the original type form being molded or transferred into the Vinylite (T.M.) sheet. Upon cooling the resinous Vinylite (T.M.) impression is separated from the original type form and is thereafter used as a female mold from which a reproduction of the original type form is obtained in either all plastic form or in plastic backed metal form. Preferably, the use of metal bearers 20, as shown in FIGURE 2B, with grained faces are employed with the original type form in order to imprint or impress a grained effect to the outer periphery of the Vinylite (T.M.) sheet, e.g. that outer portion of the Vinylite (T.M.) sheet which does not come in direct contact with the type itself. The role of the resulting bearer (grained) portion 21 of the Vinylite (T.M.) sheet is discussed below.

Upon separation of the Vinylite (T.M.) from the original type form, the Vinylite (T.M.) sheet is thus in the shape of a substantially flat, impression mold having grained extremities. The outer approximately one-half inch or the bearer area 21 is masked off with tape 22, as shown in FIGURE 2B in order to minimize the adhesion of the underlying area to the resin cast in a subsequent step. Then, a thin layer of silver is deposited, by conventional chemical spray method, on to the face of the Vinylite impression mold, as disclosed generally at page 1 above, rendering the mold electro-conductive.

The silvered impression mold having partially masked bearer surfaces is placed in a metal, e.g. copper, electroplating bath, as in the conventional manufacture of electrotypes, maintained at approximately 90° Fahrenheit. The mold is thus plated with a metal, e.g. copper, deposit 14*a*, electrodeposition being conducted for a period of about one and one-half hours or less. In the conventional preparation of a metal (lead) backed electrotype copper shell, two and one-half or more hours are usually required. By employing the impression molds and the novel resin formulations of the present invention, the copper electroplating time can be cut to one-half or less because a copper shell of only 50 percent or less thickness of the conventional shell is required. This is an important innovation.

Conventionally, as shown in column 1, the electrotype shell (copper) is stripped from the impression mold. Thus, the copper shell must be thick enough to be self-supporting and strong enough to withstand the temperature and pressure of the molten lead which is poured or cast against the back of the shell. In the present invention, the electrotype shell need not be stripped from the impression mold until after the resin composition has been applied to the back of the electrotype shell. Thus, because the impression mold is retained to support the metal electrotype shell, the required thickness of the shell may be as little as one third of that conventionally needed. A substantial saving in time is accomplished. Likewise, where electrotypes utilizing nickel or other conventionally used metal surfaces are desired, the thickness of the electro-deposition can be substantially reduced to the minimum thickness necessary to withstand the wear in the printing press. For example, with nickel shells, it is possible to either minimize or eliminate the usual copper backing. The shells thus utilized in the present invention generally are too thin for satisfactory use when backed by conventional metals, e.g. lead. Upon removal of the copper plated mold from the electrolytic bath, a thorough rinse is applied.

Thereafter, an extremely thin electrodeposit of tin, or other metal or alloy having properties similar to tin, is applied to the copper deposit to improve adhesion of the shell to the resin applied in a subsequent step in the process. For example, zinc, brass, aluminum and other metals have been employed satisfactorily under certain conditions. The copper plated mold can be left in the tin plating solution for as few as three minutes with resulting improvement in surface characteristics of the copper. The copper deposit, with or without the tin or other metallic deposit on its back side, is generally referred to as a copper "shell."

Enhancement of the adhesion of copper to the novel resin formulation in the casting step may also be achieved by utilization of a coarse copper electrodeposit in the preceding step. Adjustment of the electrolytic bath in the copper plating step whereby additional amounts of iron are dissolved can lead to the desired coarse copper deposit.

Alternatively, the adhesion of resin to the copper electrotype shell can be improved by treating the copper surface with ammonium hydroxide ($NH_4OH$) for from fifteen to thirty seconds, followed by an aqueous rinse and air drying. It is believed that the copper oxide or hydroxide thus produced is readily linked to the free hydroxyl radicals of the epoxy resins contained in the preferred resin formulations.

Still another mode of enhancing the adhesion of the copper to the resin involves the etching of the copper surface by application of a mixture, formed from fifteen cc. of ferric chloride (47 percent solution), thirty cc. of concentrated nitric acid and one hundred ninety seven cc. of water, for a period of one to two minutes, followed by a thorough aqueous rinse and air drying.

Following the application of the tin electrodeposit or alternative treatment to improve the character of the copper surface, the copper plated Vinylite (T.M.) mold is still in substantially flat shape, apart from the indentations or impressions made in taking the impression of the original type form. The tape or masking is now removed from the bearer area of the mold, care being taken not to loosen the copper shell from the mold at any point. Excess copper is removed. The cleared area exposed by removal of the tape subsequently becomes the walls of a dam formed in the next "traying" operation. At the same time, a hot stopping-off iron is run along the four edges of the mold in order to provide a tighter bond or weld between the copper shell edges and the Vinylite (T.M.) mold, thus preventing the resin formulation, applied as the backing, from flowing along the interface between the copper shell and the Vinylite (T.M.) mold. Alternatively, any sealing material can be used provided it is readily released from the resin casting.

In forming the "tray" for pouring or casting of the resin formulation, the Vinylite (T.M.) impression mold having the carefully prepared copper surface still attached is notched at the four corners so that the edges of the Vinylite (T.M.) mold can be turned upward to provide a dam for containing the resin formulation. Preferably, the edges of the mold are held against the edge of a hot plate along the line where the bend is to be made, and, upon heating, the extremities of Vinylite (T.M.) mold are bent readily to a 90 degree angle, after which the resulting tray is cooled. The taped portion of the bearer or grained surfaces, which have been purposely kept clean by the above described taping technique, have now become both the side walls of the dam surrounding the tray and a small portion of the bottom of the tray, as illustrated generally in FIGURE 6. Putty is applied to the interior corners of the dam and reinforcing tape is applied to the outside of each corner to prevent leakage of the casting formulation.

Next, the prepared tray is placed on a vacuum table, maintained at about room temperature, and having a thin coat of machine oil spread on its surface and being covered with a piece of heavy paper. If it is difficult to retain the "tray" in substantially flat relationship to the vacuum table, the excess area of the table not in use may be covered, thereby producing greater vacuum on the prepared mold or "tray." Total vacuum pressures of ten to twelve inches of mercury are usually sufficient to maintain the mold in the desired flat plane, despite the stress or tendency to warp caused by the reaction of the resinous system when the resin formulation is actually cast. Excessive vacuum pressures tend to cause local "buckling" in the mold, thereby producing slight concavities in the finished plastic backed electrotype.

Alternatively, the vacuum table may be heated where it is desirable to shorten the curing cycle of the resin for modulation employed as the backing. For example, the temperature of the table may be maintained at about 80 to about 90 degrees Fahrenheit where resin-hardener temperatures are controlled at 125 degrees Fahrenheit or less. In such event, the interface between the vacuum table and the "tray" or mold should not be substantially in excess of 100 degrees Fahrenheit. It is desirable to maintain a substantial differential between the temperature of the vacuum table and the resin-hardener system. In some instances a rubber blanket is inserted between the table and the mold, in which event somewhat longer curing time will result.

Immediately prior to the actual casting operation, the copper shell is treated with a "sensitizing agent" in liquid form, which treatment is an innovation designed to further prepare the surface of the copper shell for contact with the resinous formulation employed as the backing material. At this point, it is apparent that the impressions in the copper shell correspond with the impressions of the original type form. Treatment with the sensitizing agent assures that intimate contact between the resin and the interstices of the copper shell is maintained not only during the subsequent curing of the cast resin but in the subsequent continued printing with the plastic backed electrotypes. If adhesion between the copper and the resin is not of the highest order, such interface may cleave either (*a*) during curing because of the internal forces and stresses resulting from the exothermic reaction between the hardener and the resin portions of the resinous formulation, or (*b*) during the impact to which the interface is subjected in the actual printing operation as the electrotype is used. An alcohol of the lower alkanol series is preferably employed as the sensitizing agent since it does not readily attack the Vinylite (T.M.) mold or other impression sheets used. Ethyl and isopropyl alcohol are the preferred species embodiments, it being necessary that the specific gravity of the alcohol be less than that of the resin formulation employed. In addition to the effect in preparing the copper surface, the sensitizing agent serves to displace any entrapped air at the resin-copper (metal) interface. The sensitizing agent must be of relatively low viscosity. In practice, the excess sensitizing agent is displaced to the surface as the resin-hardener portions of the resin formulations react, leaving the copper-resin interface air and solvent free.

For some applications, it is possible to use certain non-reactive materials whose specific gravity is less than that of the resin formulation, such as toluene and the like. Such sensitizing agents are probably not displaced completely to the surface. Other sensitizing agents may include reactive diluents, such as compositions containing low viscosity epoxy moieties, which are displaced into the interior or body of the resin as cast and which may actually react with such resin.

Finally, the resin formulations, exothermic in nature, are applied to the copper surface of the tray and contained by the walls of the dam. The general and preferred embodiments of the resin formulations are disclosed in the examples below. The completed resin formulation, containing the hardener, the resin per se, the fillers and the agents required to impart resiliency, is cast in the mold up to a thickness of one-quarter inch or more, casting heights of 0.13 and 0.20 inch being frequently employed. In order to maintain resistance to buckling and warping in the tray or mold, constant vacuum pressure is maintained until the resin is at least gelled. Additional weights may be applied to the top edges of the tray, thus maintaining it flat against the table. When no reinforcing plate or slab (metal) is employed in the plastic backing, the resin formulation is dispensed into the mold in a single step.

However, for certain purposes, as in the manufacture of curved electrotype plates for use on rotary or cylinder presses, a reinforcing plate or wire screen in the interior of the plastic backing is employed. Preferably, a perforated aluminum plate is used with patent base or for curved electrotypes other than non-stretch, curved electrotypes, in which event the resin formulation is first applied to the height of the relief areas present in the copper shell and the supporting plate then positioned directly on the relief areas. Thereafter, the remaining resin formulation is applied to the ultimate, desired thickness. If, upon positioning of the perforated plate, buckling is observed, additional pressure is placed on the appropriate parts of the perforated plate and the remaining portion of the resin formulation poured over the plate and to the desired overall depth in the mold or tray.

The incorporation of the metal plate is not used merely for additional strength but eliminates serious problems that are peculiar to the "backing procedure" employed in the formation of any printing plate. For example, in the formation of curved electrotype plates, it provides stability to hold the corrected curvature and prevents the cured resin system from stress-relieving its internal tension by which the curved plate might otherwise return to a somewhat flatter shape. In addition, the plate adds overall strength to the backing whereupon resistance to pressure of plate hooks employed in many conventional presses and in the mounting on patent bases is accomplished. Without such plates, the excessive pressure exerted by the hooks may bend or break the plastic backed electrotypes.

After the pouring of the casting is completed while using the heated vacuum table technique described above, infra-red lamps either at the appropriate distance from the resin surface or at controlled voltage are turned on directly above the resin casting. The temperature of the vacuum table surface should be not over about 105 degrees Fahrenheit. Temperatures substantially in excess of this will readily cause an uncontrollable exotherm in the resin formulation, resulting in warpage to the casting and destruction of the delicate Vinylite (T.M.) impression mold. Omission of external heating results in greater curing time requirements. With the preferred resin formulations set forth below, gelation usually occurs in between about fifteen and about forty minutes' time. The cast is usually sufficiently cured in from 50 to 90 minutes to be removed and subjected to the needed machining and finishing, in which event the plate is kept flat until ready for machining since any warpage in the resin cast tends to return after machining to its originally warped condition.

In decreasing the curing time, the casting, once reaching the gelled stage, may be exposed to forced heat to as high as 125 degrees Fahrenheit for periods of time up to one-half hour, at which point it may be stripped from the mold. Thereafter, the curing can be conducted at substantially elevated temperatures, i.e. 200–220 degrees Fahrenheit, while maintaining the casting in a flat position since the Vinylite (T.M.) mold is no longer present to impose the temperature limitations on the casting.

Preferably, the casting is retained in the Vinylite (T.M.) impression mold for substantially the full curing period in order to minimize chances of warpage.

The metal shell having the cast resin backing is stripped from the impression mold upon substantial completion of the curing of the resin in the following manner. The reinforcing tape is removed from the corners of the mold and slight pressure exerted on the edges of the dam members to initiate separation of the walls of the dam from the resin backing material. The edges of the mold or tray along the line that is bent to the 90 degree angle are placed against a hot table (300 degrees Fahrenheit) or other hot edge and the dam members are slowly returned under application of heat to a horizontal position so that the impression mold is once again made substantially flat. At this point, the impression mold is separated from the metal, e.g. copper, shell having the resin backing. The impression mold can be re-used in the making of additional plastic backed printing plates or all plastic plates.

The rough, resin backed copper shell is subjected to the finishing operation wherein the high edges from the cast are cut off during the squaring of the sides of the plate. The plate is then shaved. Preferably a shaving machine using rotary, spiral cutters (e.g. Premier or Monomelt shaver machine) is used, a maximum cut or shaving of up to 0.030 inch being taken. The plastic backed electrotype is then held securely to the shaver bed in order to prevent the plate from rolling up while being shaved and to maintain the face of the plate on the bed of the machine in a manner so that inaccuracies in the plate are shaved off via the resin backing, resulting in a true, substantially finished plate. The overall desired thickness of the plate is checked by conventional plate gauge (such as a Hacker or Vandercook plate gauge). Other standard shaving equipment, such as a Claybourn roughing and shaving machine, can be used. Generally, the shaving machines are available in electrotype shops and are widely used in conventional metal backed electrotype practice. Consequently, by adapting and carefully formulating the resin compositions of the present invention, the rough resin backed electrotype shell can be finished on such equipment. Substantial deviation from such formulations will cause the plate to be destroyed during the shaving operation. For example, if the cured resin cast is too hard, cracking along the type lines may result, and if too soft, the backing is "chewed up" and the plate must be discarded.

If the checking of the plate indicates slight, localized inaccuracies, it is still possible at this point to remove such imperfections in the manner employed to correct defects in the customary lead backed electrotypes. For example, the resin backing may be pressured with sufficient impact to return any "low" portions of the copper face to the proper printing plane. Such finishing procedure in forming conventional lead backed copper plates is described above. Such pressuring could not be accomplished without utilizing the novel resin formulations of the present invention.

During the shaving operation, make-ready, e.g. adjusting the printing surface to print with the right pressure on the paper, can be incorporated in the plate thereby effectively reducing or eliminating the extensive make-ready operation usually conducted at the time the finished plate is positioned on the printing press.

Conventionally, due to lack of complete accuracy in printing surfaces, printing plates, and in the press itself, it is necessary to make-ready the press by varying the thickness of the packing below the surface supporting the material to be printed upon or by insertion of tissue paper or other material behind the printing plate thus bringing the material to be printed and the printing surface into intimate contact. Additional make-ready is required to develop the desired differences in pressures needed to obtain fine printing.

In the process of the present invention make-ready can be incorporated in the plastic backed electrotype by inserting the make-ready members, e.g. paper or resin impregnated paper laminates, against the appropriate portions of the metal face prior to shaving. This is preferably accomplished before the first shaving operation in the case where the original type forms or plates contain no noticeable variations in height. Otherwise, it is accomplished after the plate has been checked and inaccuracies, if any, are corrected, as discussed above. The make-ready, thus inserted, develops on the press the desired differences in pressures needed to obtain fine printing.

The bearers are now removed by cutting with a fine-tooth band saw (also conventional electrotype equipment) so that the overall dimensions of the plate are cut to final size. The plastic backed electrotype is now ready for either (1) curving for adaptation as a curved electrotype or (2) mounting on a wood or metal surface.

If mounted, the wood base and plate height are predetermined for the type-height, allowance being made for a few thousandths of an inch of plastic cementing material. The surface of the wood and the back of the plate are coated with resinous cement (for example, Pliobond–20 cement) and permitted to dry to touch. A sheet of pressure sensitive tapes, cut to the size of the plate, is laid on the wooden block over the adhesive. The tape may be reactivated by application of solvent, e.g. methyl ethyl ketone or acetone. When the tape is sufficiently tacky, the plate is placed firmly on the block in the correct position and all entrapped air between the plate and wooden block forced out. The final step involves the leveling of the completed plate with a rubber-faced planing block and the final checking of the mounted, plastic-backed electrotype for accuracy. An alternative, but not to be preferred, mounting procedure involves the nailing of the plastic backed electrotype to the wooden block.

If a curved plastic backed electrotype is desired, a roughly cast plastic backed metal shell is shaved and squared as described above. A satisfactory curving procedure involves the pre-heating of the plate to about 90 degrees Fahrenheit and insertion of the plate in either a standard Ostrander vertical or horizontal bending machine (both conventionally used in electrotype practice to curve lead backed electrotypes). The resulting curved plate can then be used in cylinder or rotary presses. The criticality of the novel resin formulations is forcefully demonstrated at this point in the preparation of the electrotype since the curving machine will readily produce a fracture at the type line if the cured resin system is too hard and will produce collapsing of the plate if the cured system is too soft or too resilient.

Alternatively, the curving operation can be conducted without heat, especially if a perforated metal insert, or other web-like reinforcing member, has been cast into the resin backing.

Still another alternative curving operation involves the use of an aluminum saddle which is pre-curved to the desired diameter. The metal saddle on the face portion thereof and the plate on its back portion are treated with a resinous cement (Pliobond–20) and permitted to dry to touch. A piece of pressure sensitive tape is again placed on the aluminum saddle, and activated with solvent. The plate is placed on the aluminum saddle, and the tape activated with solvent. The plate and the saddle are firmly placed together. The saddle-supported, plastic backed electrotype can now be forced through a conventional plate curving machine, set at the pre-determined diameter setting. In this operation, a resilient blanket is placed against the printing surface of the plate for protection purposes and to assure perfect lamination of the aluminum saddle to the back of the resin backed plate. The above procedure is preferably used when minimum or no stretch of the printing surface is desired.

Figure 4:
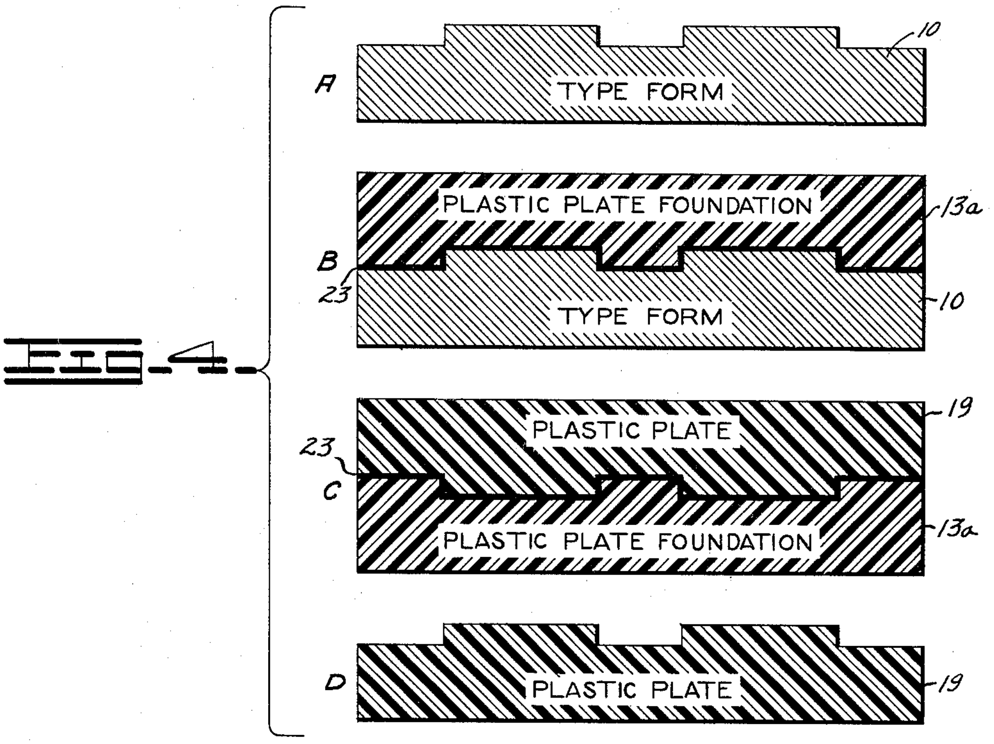
FIGURE 4 is a schematic presentation of a modified process for forming an all plastic plate in lettered sequence commencing with a type form and showing finally the finished plate with indicia showing the use of a parting agent.

While this detailed description of the preparation of the improved printing plates of the present invention has been made with special emphasis on plastic backed metal printing plates, e.g. plastic backed copper electrotypes, the procedure has been conducted successfully in the preparation of an all-plastic plate, as described generally earlier in the specification and as illustrated in FIGURE 4. Of course, the portions of the process involving the deposition of the various metals, the improvement of the adhesion properties of the metals and the other steps which must be conducted in forming of the metal shell are eliminated. However, the casting, shaving, and other finishing operations remain essentially the same.

The physical and chemical specifications which the plastic backed printing plates and all plastic printing plates must meet are necessarily functions of the limitations imposed by (*a*) the use of the resinous impression molding sheets, (*b*) the adhesion and other affinity properties of the metal shell for resins, (*c*) the time, temperature and warpage limitations in the casting and curing cycle, (*d*) the machinability and resiliency requirements in the shaving and finishing operation, and (*e*) the impact resistance, abrasion resistance, dimensional stability, resiliency and continued resin-metal adhesion requirements demanded during long continued use in the actual printing operation. In general, epoxy resin systems, especially formulated, are preferably employed. The general characteristics and structure of these preferred resins are set forth earlier in the specification.

*Resin Formulations*

The following examples illustrate the improved resin formulations developed to impart the desired chemical and physical properties to the finished resin backed or all resin plates.

*Example 5*

| Material: | Parts by weight |
|---|---|
| Epoxy resin (Epon 828) | 60 |
| Epoxy modifier (Epon 562) | 40 |
| Powdered aluminum (Alcoa 101) | 50 |
| Epoxy hardener (Curing Agent T–Shell) | 18 |

The above admixture is thoroughly stirred until complete homogeneity is obtained and is then ready for casting. The epoxy resin (Epon 828) is aromatic in nature and provides the basic resin component, together with the epoxy modifier (Epon 562). The epoxy modifier is aliphatic in nature and tends to reduce the viscosity of the system and, thus, to eliminate entrapment of air. In addition, the epoxy modifier, itself a composition containing epoxide linkages, provides badly needed resiliency in the cured cast. However, the epoxy modifier (Epon 562) as a resin is too fast reacting and not sufficiently stable to be used as the sole epoxy component. The resulting blend of the epoxy resin and epoxy modifier provides a system, having the necessary viscosity, that reacts exothermally at low temperature to give a relatively fast curing cycle. The hardening agent (Curing Agent T) is believed to be a reaction adduct of diethylenetriamine and ethylene oxide.

The aluminum powder functions to dissipate the heat generated exothermally during the molding or casting operation so that the impression mold is not warped or otherwise damaged. In addition, the metal filler imparts an excellent machinability quality to the finished casting so that the conventional shaving and finishing equipment used in printing plants can be applied to the plastic backed electrotypes or all plastic plates.

The above formulation reacts over the desired temperature range at a resin temperature of between about 110 and about 120 degrees Fahrenheit. When the heated vacuum table procedure is employed, without use of the rubber blanket, a curing time of only about one hour results. With the rubber blanket, a curing time of approximately two hours is required before the casting can be machined.

*Example 6*

| Materials: | Parts by weight |
|---|---|
| Epoxy resin (Epon 815—Epoxide Equivalent 175–210; Viscosity 500–900 cps.) | 100 |
| Polysulfide polymer (Thiokol LP–3) | 20 |
| Aluminum powder (Alcoa 101) | 110 |
| Bisphenol-A (polyolphenol-Dow) | 4 |
| Epoxy hardener (Curing Agent T) | 20 |

The epoxy resin (Epon 815) and hardener (Curing Agent T) formulation, without modification, is too fast a reacting system and yields a cured casting that is somewhat hard for the purposes of the present invention. The polysulfide polymer (Thiokol) is employed to counteract this hardness and to provide desired resiliency in the system at the machining stage. The unusually high proportion of metal filler (aluminum) dissipates the high exotherm of the resin-hardener system and likewise contributes to good machinability. However, the aluminum powder inherently slows down the reaction and Bisphenol-A is added to further accelerate the system in view of the effect of the aluminum filler.

*Example 7*

| Material: | Parts by weight |
|---|---|
| Epoxy resin (Epon 815) | 95 |
| Epoxy modifier (Epon 562) | 5 |
| Powdered aluminum (Alcoa 101) | 90 |
| Epoxy hardener (Curing Agent T-Shell) | 21 |

The above admixture can be dispensed through automatic dispensing apparatus and is sufficiently cured within one hour following pouring to permit machining of the rough cast.

While the identity of the components varies in the formulations of Examples 5, 6 and 7, these formulations provide the desired properties in both the casting operation and in the finished printing plate. Since the basic resin (Epon 828) in Example 5 is of greater viscosity than the basic resin of Examples 6 and 7 (Epon 815), the maximum amount of filler that can be employed is about 80 parts, since amounts substantially in excess of this impart an undesirably high viscosity to the system, despite the presence of the lower viscosity epoxy modifier (Epon 562). Likewise, the ratio of hardener to epoxy resin and epoxy modifier is maintained within relatively narrow limits, i.e. 18 to 22 parts in Example 5.

In the formulations of Examples 6 and 7, greater amounts of the preferred aluminum powder can be employed before a limiting viscosity is reached because of the inherently lower viscosity of the epoxy resin (Epon 815). In addition, amounts of the hardening or curing agent vary over somewhat greater limits, i.e. 15 to 25 parts per 100 parts of resin, than in the formulation of Example 5. Excessive amounts of hardener lead to a shorter pot life and curing cycle but cause too much hardening in the finished casting.

It is apparent that the novel processes and resin formulations described above can be altered without departing from the scope of the invention. For example, in the preparation of plastic backed electrotypes, the metal shell, e.g. copper or zinc, can be stripped from the impression mold prior to, rather than after, the casting of the resin backing. In such event the thickness of the electrodeposit is of the order of that usually made when a metal backed electrotype is prepared, i.e. about two or three times the thickness of the shell employed in the novel plastic backed electrotype procedure described above. The unsupported metal shell is then surrounded by dams, or inactually turned up at its outer edges, and the resulting mold maintained in a substantially horizontal plane, as by vacuum means, while the resin formulation is cast and cured. In such event, since the impression mold is not attached, resin reaction and curing temperatures of somewhat higher order can be tolerated so that the curing time will be substantially reduced. At the same time, the metal shell cannot be subjected to unduly high temperatures since stresses and distortions will be introduced into the metal shell, causing the quality of reproduction to be seriously affected in the performance with the final printing plate. In conventional electrotype practice, the pouring of the molten lead or other alloys as backing metal usually causes such stresses and distortions in the electrotype shell.

While this alternative procedure for making plastic backed electrotypes is operable, the time saved by the faster curing cycle does not compensate for the much greater length of time required to electrodeposit the thick shell which has to be used when the resin backing is applied without retaining the resinous impression mold.

While the preferred resin formulations are set forth in the above examples, it is apparent that the various components can be replaced by other materials which in combination will impart the desired properties to the finished resin backed or all plastic plate while at the same time reacting under the controlled conditions required by the limitations of the impression molds and the metal shells themselves. Other epoxy resins, taken alone or in combination with reactive diluents or modifiers can be used, although a large number of the epoxy resins being marketed commercially for the casting or tooling trade are too hard, unless modified as shown above. It is believed that the newly developed combination epoxy-vinyl resins may have the desired properties. Resins or mixtures of resins which produce substantial shrinkage when cured are not desirable.

Likewise, other polyfunctional amine compounds having an active hydrogen can be employed as the hardeners or catalysts for the epoxy resins, especially those aromatic amines which tend to elevate the heat softening point of the finished cast. In the formulations of the present invention, it has been necessary in some instances to use hardeners (curing agents) with resins not recommended by the producers for satisfactory casting operations. Acids and dibasic acid anhydrides having active hydrogens can be employed as catalysts in some instances.

In addition, other modifying resins or reactive diluents can be employed to impart desired viscosity to the resin-hardener system and in some instances the desired resiliency in the finished casting. For example, other reactive diluents such as allyl glycidyl ether or phenyl glycidyl ether and the like may be employed. Certain modified alkyd, polyamide and vinyl resins, in addition to polysulfide polymers and synthetic latices, may be utilized in minor amounts as modifying resins, especially to provide resiliency in the finished cast.

Other fillers, especially metal fillers, of relatively fine particle size are used. Fillers which swell up and absorb the resin-hardener admixtures are not generally desirable. The metal fillers tend to conduct away or dissipate the heat generated exothermally in the reactions and give a desired machineability quality to the finished plates. Such metals as aluminum, lead, zinc, iron and various alloys are satisfactory. The atomized aluminum powders of about 325 mesh size are preferred. In general, fillers having particle size of the order of about 10 to about 15 microns are satisfactory. Where the resin formulations can be reacted at relatively low temperatures and curing times are not important, other fillers such as inorganic silicates, calcium carbonate, metal oxides, e.g. iron and lead, can be used. Although these fillers enhance the abrasion resistance and compression strength of the castings, the powdered metals are still the preferred embodiments. Polyamide fillers, e.g. nylon, are operable in some cases, such as in the preparation of the all plastic plate.

Figures 5, 6:
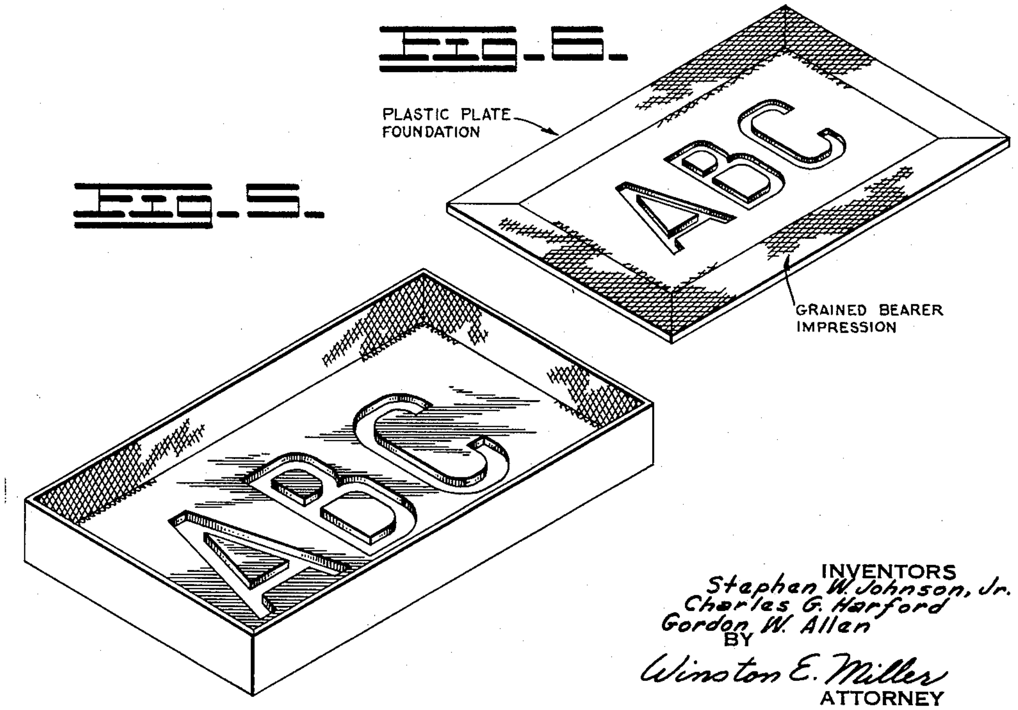
FIGURE 5 is a perspective view of a tray formed by turning up the serrated bearer surfaces to form dams for the casting of the final printing plate.
FIGURE 6 is a perspective view showing the flattened plastic sheet before the serrated bearer formed surfaces are turned up, but showing the corners split to assist in forming the tray.

The preparation of the all plastic plate using the procedure of the present invention has been generally described in Example 3 above and is further illustrated in FIGURE 4, A, B, C and D. When the relatively soft, resinous impression molds, such as the Vinylite (T.M.) sheet or the resin-gum-wax molded tablet, are employed, the resulting, flat impression mold can be stripped from the type form, as shown in FIGURE 6. The edges of the mold are held against the edge of a hot plate along the line where the bend is to be made and the extremities of the mold bent readily to a 90° angle, thereby forming a "tray" as in FIGURE 5, into which the resin formulation, such as that illustrated in the above examples, is poured directly. Preparatory to the pouring of the casting, a parting or lease agent is spread over the exposed surface of the tray. Silicone mold release fluid, e.g. dimethylpolysiloxane of 200 to 1000 cps. viscosity, graphite lubricants, waxes, polyvinyl alcohol and the like are suitable release agents. Since the same resinous impression sheets are employed as specifically discussed above, the limitations inherent in the relatively soft impression molds dictate the fast acting resin formulations be used that cure rapidly at low temperature, but which yield tough, impact and abrasion resistant plates, having substantial resiliency. The casting step is carried out as detailed above and the finishing operation, including any make-ready, is conducted in the same manner described above for preparing the plastic-backed electrotype shells.

Alternatively, the all plastic plate can be formed in the manner illustrated in FIGURE 4 wherein, for example, an epoxy resin formulation is employed as the impression mold, i.e. the plastic plate foundation 13*a*. In such event, suitable dams, e.g. wood, metal, plastic and the like, are placed around the type form 10, as shown in FIGURE 4A. A parting agent, 23, preferably dimethylpolysiloxane, is applied to the surface of the original type form 10, as shown in FIGURE 4B, and the epoxy resin formulation of the type illustrated in Examples 5, 6 and 7 poured into the mold. Alternatively, and preferably, a hardening agent such as meta-phenylene diamine is used in the epoxy formulation to impart a higher heat softening point to the resulting epoxy impression mold. Upon curing, the epoxy impression mold is stripped from the type form and thus becomes the female plastic plate foundation 13*a*, as shown in FIGURE 4B and C. The dams are placed around the plastic plate foundation 13*a* and the parting agent 23 applied to the surface of the mold. Utilizing the resin formulations of the examples, e.g. Example 6, the plastic plate 19 is poured, as illustrated in FIGURE 4C. Upon curing, the plastic plate is stripped from the plastic plate foundation 13*a* and is shaved and planed into final form, as described above. The all plastic plate is now mounted, as described above, if desired. Phenolic resins, e.g., phenolformaldehyde, and epoxy-modified phenolic resins can also be used for such impression molds.

While the general description of the process shows two useful vacuum techniques for applying the resin backing formulation to a mold or tray maintained under vacuum pressure, other means may be used to prevent the mold and/or metal electrotype shell from warping or being distorted during the casting step. For example, heavy metal bars positioned on top of the mold may exert sufficient pressure to prevent such distortion. The increased levelness of the finished printing plates of the present invention, as compared with the usual metal backed plates, results in part from retention of the mold and/or metal shell in a virtually flat position while the resin backing is poured and cured, and while the finished plate awaits machining. Consequently, the amount of finishing required to correct the plate is less than with metal backed electrotypes.

The completed all plastic plate and plastic backed electrotypes of the present invention in addition to possessing the desired resiliency and wearing qualities are not affected by the usual cleaning solutions and solvents employed in the actual printing operation. Further, if the electrotype shell is given a final chrome plating, the resin backing is resistant to the chrome plating solution. Finally, the finished plastic backed and all plastic plate weigh only about twenty to thirty percent as much as the conventional metal backed printing plates.

The term "original plate" as used in this specification includes surfaces for reproduction having type characters and/or a surface suitable for half-tone printing reproductions. Further, this term includes gravure printing where the ink is retained in a recess rather than on the surface. This term includes all types of printing surfaces that are to be reproduced.

This application is a continuation-in-part application of our earlier filed application Serial No. 577,099 filed April 9, 1956, and now abandoned, for Plastic Printing Plates.

Obvious modifications may be made in the resin formulations, processes and printing plates of the present invention without departing from the scope thereof and it is to be understood that the invention is limited only as defined in the appended claims.

We claim:

1. The method of forming a plastic backed electrotype which comprises: making a vinyl resin impression of an original type form; separating said vinyl impression from said original type form, thereby producing an impression mold; depositing a thin layer of silver on the face of said mold; electrodepositing a copper shell on the silvered face of said mold; electrodepositing tin on the exposed portion of said copper shell; bending up the peripheral edges of said mold to form a dam around said mold; applying a liquid sensitizing agent to the said copper shell; applying an epoxy resin composition to the sensitized copper shell while retaining said mold against a substantially flat plane by vacuum means; curing the said epoxy resin composition while retaining said mold against said substantially flat plane; stripping the vinyl resin mold from the resulting epoxy resin backed copper shell to provide an unfinished plastic backed electrotype; finishing said plastic backed electrotype with conventional metal working electrotype equipment; and mounting the finished plastic backed electrotype.

2. The method of forming a printing plate which comprises:

(*a*) making a resinous impression of an original plate;
(*b*) separating said impression from said original plate, thereby producing an impression mold;
(*c*) depositing a metal shell on the face of said mold;
(*d*) providing a dam around said mold;
(*e*) applying a liquid sensitizing agent to the exposed portion of the metal shell on said mold;
(*f*) applying a resinous composition in a substantial thickness comprising about 95–100 parts by weight of a liquid epoxy resin, about 50–130 parts by weight powdered aluminum and about 15–25 parts by weight of an epoxy hardener per 100 parts of the epoxy resin to the thus sensitized metal shell;
(*g*) curing the resinous composition at a temperature between about room temperature and about 220° F; and
(*h*) stripping the said mold from the thus formed resin backed metal shell.

3. The method of forming a printing plate which comprises:

(*a*) making a resinous impression of an original plate;
(*b*) separating said impression from said original plate, thereby producing an impression mold;
(*c*) depositing a metal shell on the face of said mold;
(*d*) providing a dam around said mold;
(*e*) applying a liquid sensitizing agent to the exposed portion of the metal shell on said mold;
(*f*) applying a resinous composition in a substantial thickness comprising about 95–100 parts by weight of a liquid epoxy resin, about 50– 130 parts by weight powdered aluminum and about 15–25 parts by weight of an epoxy hardener per 100 parts of the epoxy resin to the thus sensitized metal shell;
(*g*) curing the resinous composition; and
(*h*) stripping the said mold from the thus formed resin backed metal shell.

References Cited in the file of this patent

UNITED STATES PATENTS

| | | |
|---|---|---|
| 163,204 | Huntoon | May 11, 1875 |
| 1,139,259 | Cottrell | May 11, 1915 |
| 1,151,317 | Wood | Aug. 24, 1915 |
| 1,310,087 | Redman | July 15, 1919 |
| 1,377,504 | Novotny | May 10, 1921 |
| 1,377,509 | Novatny | May 10, 1921 |
| 1,379,433 | Yeoell | May 24, 1921 |
| 1,533,656 | Mullen | Apr. 24, 1925 |
| 1,803,548 | Drake | May 5, 1931 |
| 2,217,039 | Beck | Oct. 8, 1940 |
| 2,400,518 | Kreber et al. | May 21, 1946 |
| 2,504,080 | Myers | Apr. 11, 1950 |
| 2,571,397 | Wells | Oct. 16, 1957 |
| 2,731,437 | Bender et al. | Jan. 17, 1956 |
| 2,735,829 | Wiles et al. | Feb. 21, 1956 |
| 2,802,897 | Hurd et al. | Aug. 13, 1957 |
| 2,839,480 | Ott et al. | June 17, 1958 |

FOREIGN PATENTS

| | | |
|---|---|---|
| 448,965 | Italy | May 30, 1949 |
| 659,766 | Great Britain | Oct. 24, 1951 |